United States Patent [19]

Birli

[11] 4,079,589
[45] Mar. 21, 1978

[54] ELECTRO-THERMAL ACTUATOR WITH VALVED BOILER CONFIGURATION

[75] Inventor: Joseph A. Birli, Richmond Heights, Ohio

[73] Assignee: Design & Manufacturing Corporation, Willoughby, Ohio

[21] Appl. No.: 753,890

[22] Filed: Dec. 23, 1976

[51] Int. Cl.² .............................................. F03G 7/06
[52] U.S. Cl. ...................................... 60/530; 60/531
[58] Field of Search ............... 60/527, 528, 529, 530, 60/531; 236/99, 100, 101 R; 73/363, 368, 368.2

[56] References Cited

U.S. PATENT DOCUMENTS 2,578,992   12/1951   Dickey .................................. 60/531

Primary Examiner—Allen M. Ostrager
Attorney, Agent, or Firm—Maky, Renner, Otto & Boisselle

[57] ABSTRACT

An electro-thermal actuator includes a valve in a partition between a boiler chamber containing the fluid and a variable volume chamber formed in part by a diaphragm. Such valve consists of a bore through the partition which is normally closed by a limited portion of the spring biased diaphragm, the bore being opened when the boiler chamber fluid pressure at the limited diaphragm portion overcomes the spring immediately to expose the entire diaphragm to such relatively high pressure rapidly to drive the same through the expansion stroke.

5 Claims, 2 Drawing Figures

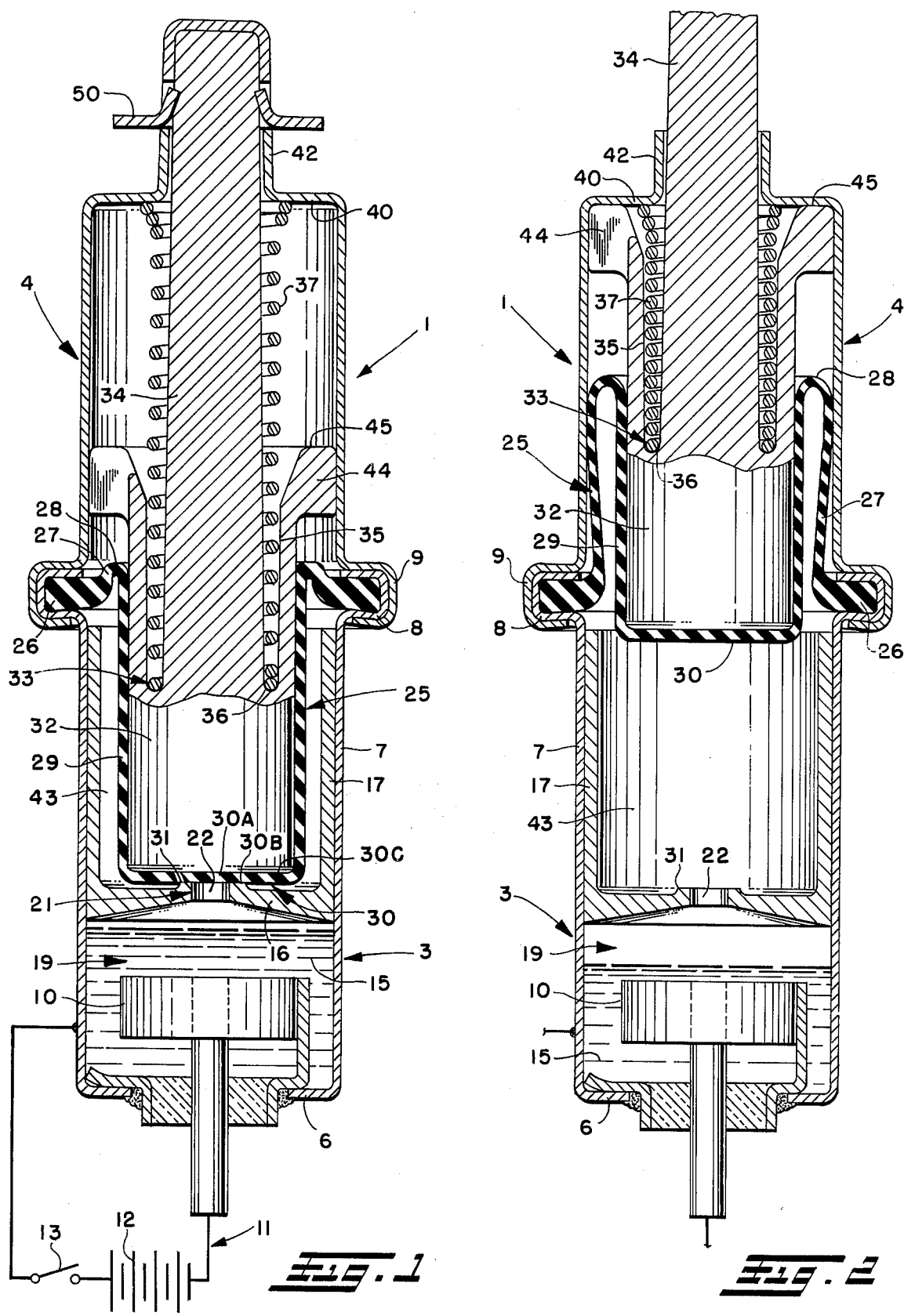

111
ELECTRO-THERMAL ACTUATOR WITH VALVED BOILER CONFIGURATION

BACKGROUND OF THE INVENTION

This invention relates to an electro-thermal actuator in general and to a valved boiler therefor to produce a snap-action output in particular.

In copending, co-assigned Sobecks application filed concurrently herewith, a fluid displacement actuator is disclosed in which a ported barrier is positioned between the boiler chamber and the actuator chamber. Such ported barrier permits fluid to be displaced therethrough by increased pressure in the boiler chamber to drive the diaphragm and piston assembly through the expansion stroke, the displaced fluid having a lower temperature coefficient heater, thereby to reduce the permeation of the elastomeric diaphragm. Such ported barrier thereby increases the life of the actuator but is relatively slow acting because the entire diaphragm is exposed to the working fluid throughout heater energization.

To provide for a snap-action output, the present invention includes a single valve having a limited diameter bore in the partitiion that opens only when a predetermined, relatively high pressure is attained in the boiler chamber. By building up such high pressures before the valve is opened, substantially the entire diaphragm is rapidly exposed to such relatively high pressures quickly to drive the diaphragm and piston assembly through the expansion stroke with a snap-action effect. This snap-action permits the heater in the boiler chamber to be de-energized immediately upon the desired pressures in the boiler chamber being reached.

It is accordingly the principal object of the invention to provide an electro-thermal actuator having a snap-action output.

It is another object of the invention to provide a partition between the heater and diaphragm, with said partition having a valve therein that opens only when a predetermined pressure in the boiler chamber is achieved. Such valve thus ensures that the diaphragm does not begin its expansion stroke until substantially the entire working surface of the same can be exposed to expanding fluid of predetermined relatively high pressure.

It is still another object of the present invention to provide an electro-thermal actuator having a fast expansion and contraction cycle. This object is accomplished by the snap-action output in combination with a subsequent relatively quick cool down period for the working fluid to permit a rapid, spring loaded contraction stroke. The fluid cool down period is improved by the heater being de-energized before expansion is completed and/or by the relatively cool walls of the previously isolated actuation chamber providing an improved heat exchange effect with such fluid.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

In the drawing:

FIG. 1 is a sectional elevation of the electro-thermal actuator of the present invention with the heater de-energized and the diaphragm and piston assembly at the instroke position; and FIG. 2 is a sectional elevation similar to FIG. 1 with the heater energized and the diaphragm and piston assembly at the fully expanded outstroke position.

DESCRIPTION OF THE PREFERRED EMBODIMENTS

Referring now in more detail to the drawing, the electro-thermal actuator, indicated generally at 1, includes a housing consisting of a generally cylindrical casing 3 interconnected with a generally cylindrical guide cap 4. The cylindrical casing 3 includes an end wall 6, and annular side wall 7, and a radially outwardly extending but inwardly facing annular channel 8. Such channel 8 is internested in and joined to a similar radially outwardly extending but inwardly facing channel 9 on the cap 4, thereby to complete the actuator housing.

A heater element 10, preferably a coil resistance type heater, is positioned in the void defined by the cylindrical casing 3 in the manner described in more detail in copending and co-assigned Huebscher application Ser. No. 623,669, filed Oct. 10, 1975, which is incorporated herein by reference thereto. Such resistance heater 10 is part of an electrical circuit 11 including a power source 12 which is energized by the switch 13 being closed or de-energized by the switch 13 being opened (FIG. 1). Although a resistance type heater is illustrated, a positive temperature coefficient heater, as illustrated and described in the above-mentioned concurrently filed Sobecks application, could also be used as the heat source.

The cylindrical casing 3 is substantially completely filled with a thermally expansible and contractible pressure transmitting fluid 15 capable of undergoing a liquid-gas phase change upon heating, such as fluorinated hydrocarbon (Freon), a fluorocarbon, an alcohol, or other electrically non-conductive fluid of similar properties. As used herein, the term "fluid" encompasses both liquids and gases and/or mixtures thereof. Such fluid 15 is retained in the casing 3 by a partition 16 which is held in place by an annular flange 17 that is either suitably connected to the inner diameter of the casing 3 or is frictionally held therein by a tight press fit.

Such partition 16, which cooperates with the casing 3 to define a fixed volume boiler chamber 19, has a valve therein indicated generally at 21. Such valve includes a limited diameter bore 22 extending through partition 16. The bore 22 is normally closed by a limited portion of the diaphragm 25 extending thereacross as illustrated in FIG. 1.

More specifically, such elastomeric, rolling type diaphragm 25 includes a toe ring 26 that is secured to the actuator housing and smoothly merges into a generally cylindrical, axially oriented leg portion 27 which is folded radially inwardly at 28 to define a cylindrical cap portion 29 terminating in flat circular wall 30. The central portion 30A of such flat wall 30 normally covers the bore 22 with a portion 30B of such surface radially adjacent such central portion engaging an annular projection or seat 31 on partition 16 to form therewith a fluid tight seal. The cylindrical cap portion 29 of the elastomeric diaphragm 25 tightly receives and embraces a piston 32.

Such piston 32, which is part of a piston assembly 33 including an outwardly extending piston rod 34, is provided with annular recess 35 having a bottom wall 36, such recess receiving one end of return spring 37 which bears against such bottom wall 36. Such spring 37 generally surrounds the piston rod 34 and bears at its other end against end wall 40 of guide cap 4. Such end wall 40 is provided with a hollow boss 42 through which piston rod 34 extends, such hollow boss being only slightly larger in diameter than piston rod 34 to assist in guiding the latter during its linear reciprocal movements. As will be appreciated, the piston assembly 33 and diaphragm 25 are normally biased downwardly as viewed in FIGS. 1 and 2 by spring 37 resulting in the portion 30B of flat wall 30 engaging the seat 31 when the heater is de-energized. The diaphragm 25, partition 16 and annular flange 17 define therebetween a variable volume actuation chamber 43.

During energization of the heater 10, the thermally expansible fluid 15 at least partially surrounding the heater 10 is heated to increase the pressure in the boiler chamber. The energization continues until the pressure in the chamber at the bore 22 and the limited diaphragm surface 30A overcomes the force of the spring acting in the opposite axial direction. The diameter for bore 22 can be selectively interrelated to the force exerted by the return spring to provide the valve opening response at the desired pressure to obtain the snap action output. When the valve 21 begins to open by the end face 30 of diaphragm 25 beginning to move away from the seat 31, the entire diaphragm 25 is quickly subjected to the high pressure fluid passing through the bore 22 quickly to drive the diaphragm 25 and piston assembly 33 through the expansion stroke. The projection of seat 31 into the variable volume chamber provides an enlargement behind the outer peripheral portion 30C of the end wall 30 of diaphragm 25 that quickly fills with high pressure fluid when the smallest gap is opened between the diaphragm and seat, thereby to insure the snap action effect.

As described in more detail in copending co-assigned Huebscher application Ser. No. 623,669, such snap action expansion movement of the piston assembly and diaphragm is rather closely controlled to provide a well guided linear output for piston rod 34. In this regard, the appreciable surface contact between the cylindrical leg portion 27 of diaphragm 25 and the inner diameter of the guide cap 4 during diaphragm expansion assists the hollow boss 42 in providing such guidance function. Moreover, the piston 32 may be provided with an outwardly flared distal skirt 44 positioned in close proximity to the guide cap to further assist in the guidance. As will be readily appreciated, such guided expansion is accomplished by the diaphragm rolling at the fold 28 to permit the cylindrical leg portion 27 to become longer while the cylindrical cap 29 becomes correspondingly shorter.

The maximum outstroke travel for the diaphragm 25 and piston assembly 33 is illustrated in FIG. 2 wherein the end face 45 of distal skirt 44 engages the end wall 40 of guide cap 4. It will be appreciated that the volume of the displaced or expanded fluid 15 entering the variable volume chamber 43 defines the magnitude of stroke that is obtained from the actuator and the selected boiler chamber pressure to open valve 21 controls the magnitude of output force and the response time for obtaining the same. Moreover, by passing through partition 16, the temperature of the displaced fluid in the variable volume chamber is lower than the temperature of the fluid in boiler chamber 23 because of its physical remoteness from the heater 10. Such reduced temperature in the variable volume chamber reduces the fluid permeation through the elastomer and thus correspondingly increases the operational life of the actuator.

The actuator is de-energized by opening switch 13 to discontinue the operation of heater 10. Because of the snap action effect obtained, such switch may be opened upon the pre-selected boiler pressure being achieved to limit the on time and to more quickly achieve the contraction stroke. Alternatively, the heater may be de-energized by a feedback system (not shown) sensing the end of the expansion stroke and then opening the switch 13. Moreover, the relatively cool walls of actuation chamber 43 serve to more rapidly cool down the fluid in such chamber to provide a faster return stroke.

When the fluid has sufficiently cooled and/or recondensed, the return spring 37 drives the piston and diaphragm from the outboard position of FIG. 2 to the inboard position of FIG. 1 in which the bore 22 through partition 16 is closed by the diaphragm. This contraction stroke is limited, of course, by the partition 16 acting as a stop to the diaphragm and piston assembly. An additional stop to reduce the force transmitted to the partition 16 on contraction may be provided by a shoulder 50 on piston rod 34 engaging the end of boss 42 simultaneously with the diaphragm 25 engaging the partition. The return or contraction of the diaphragm will force the displaced fluid from the variable volume chamber 43 back through the partition 16 into the boiler chamber 19 for subsequent initiation of the expansion and contraction cycle just described.

I, therefore, particularly point out and distinctly claim as my invention:

1. An electro-thermal actuator comprising a body, a variable volume actuation chamber in said body formed in part by a diaphragm, a piston assembly on one side of said diaphragm and movable therewith to transmit force, a boiler chamber in said body containing thermally expansible and contractible fluid, heating means in said boiler chamber to apply heat to the fluid to increase the pressure in said boiler chamber, and a partition between said variable volume chamber and said boiler chamber, said partition having a valve therein that opens when a predetermined pressure is reached in the boiler chamber to permit the fluid to expand and pass from the boiler chamber to the variable volume chamber to drive the diaphragm and piston assembly through an expansion stroke.

2. The electro-thermal actuator of claim 1 wherein the valve includes a bore through the partition which is normally closed by a portion of the diaphragm.

3. The electro-thermal actuator of claim 2 further including a spring normally biasing the diaphragm into the position to close the bore through the partition, the spring holding the diaphragm in such position until the fluid pressure at the portion of the diaphragm covering the bore overcomes the spring force acting against it, thereby to drive the diaphragm away from the bore immediately to expose the entire diaphragm to the expanding fluid rapidly to drive the same through the expansion stroke in a snap action.

4. The electro-thermal actuator of claim 3 wherein the heating means is de-energized when the diaphragm opening pressure is achieved, and the spring returns the piston assembly and diaphragm from the expanded position to the contracted position when the expanded fluid cools enough to permit the spring to overcome the fluid pressure.

5. The electro-thermal actuator of claim 1 wherein the partition has a projecting annular seat about the bore on the variable volume chamber side of the same, the diaphragm being normally biased against said seat by said spring.

* * * * *